(12) United States Patent
Ma

(10) Patent No.: US 12,225,316 B2
(45) Date of Patent: Feb. 11, 2025

(54) IMAGE SENSORS WITH ON-CHIP ADC DATA COMPRESSION FOR MULTI-BIT ELECTRON-NUMBER OUTPUTS

(71) Applicant: Gigajot Technology, Inc., Glendale, CA (US)

(72) Inventor: Jiaju Ma, Monrovia, CA (US)

(73) Assignee: Gigajot Technology, Inc., Glendale, CA (US)

( * ) Notice: Subject to any disclaimer, the term of this patent is extended or adjusted under 35 U.S.C. 154(b) by 119 days.

(21) Appl. No.: 18/145,838

(22) Filed: Dec. 22, 2022

(65) Prior Publication Data

US 2023/0209226 A1  Jun. 29, 2023

Related U.S. Application Data

(60) Provisional application No. 63/294,263, filed on Dec. 28, 2021.

(51) Int. Cl.
*H04N 25/78* (2023.01)
*H04N 23/60* (2023.01)
(Continued)

(52) U.S. Cl.
CPC ............ *H04N 25/78* (2023.01); *H04N 23/60* (2023.01); *H04N 23/80* (2023.01); *H04N 25/63* (2023.01);
(Continued)

(58) Field of Classification Search
CPC ........ H04N 23/60; H04N 23/80; H04N 25/78; H04N 25/60; H04N 25/63; H04N 25/633; H04N 25/75; H04N 25/76; H04N 25/772
See application file for complete search history.

(56) References Cited

U.S. PATENT DOCUMENTS 6,885,827 B2  4/2005  Shushakov
9,225,922 B2  12/2015  Lee et al.
(Continued)

FOREIGN PATENT DOCUMENTS

EP  3716612  9/2020

OTHER PUBLICATIONS

Abhiram Gnanasamb.Andam et al: "Megapixel Photon-Counting Color Imaging using Quanta Image Sensor", Mar. 21, 2019, pp. 1-13, XP081377438, DOI: 10.1364/OE.27.017298 p. 4, line 9—p. 6, line 1; Fig. 4-5 (Year: 2019).*

(Continued)

*Primary Examiner* — Twyler L Haskins
*Assistant Examiner* — Akshay Trehan
(74) *Attorney, Agent, or Firm* — Robert C. Kowert; Kowert, Hood, Munyon, Rankin & Goetzel, P.C.

(57) ABSTRACT

An image sensor may a plurality of pixels, one or more analog-to-digital conversion (ADC) circuits, and at least one quantization circuit. The pixels may generate analog signals based on photoelectrons accumulated by the pixels when exposed to light. The ADC circuits may convert the analog signals to digital signals, wherein the digital signals may include (a) a first set of digital signals individually having a value corresponding to an integer number of discrete photoelectrons and (b) a second set of digital signals individually having a value between values of the first set of digital signals so as to correspond to a non-integer number of discrete photoelectron. The quantization circuit may convert the second set of digital signals to a third set of digital signals, wherein the third set of digital signals individually has a value corresponding to an integer number of discrete photoelectrons.

20 Claims, 9 Drawing Sheets

(51) Int. Cl.
  *H04N 23/80* (2023.01)
  *H04N 25/63* (2023.01)
  *H04N 25/633* (2023.01)
  *H04N 25/75* (2023.01)
  *H04N 25/772* (2023.01)

(52) U.S. Cl.
  CPC .......... *H04N 25/633* (2023.01); *H04N 25/75* (2023.01); *H04N 25/772* (2023.01)

(56) References Cited

U.S. PATENT DOCUMENTS

| | | |
|---|---|---|
| 10,319,776 B2 | 6/2019 | Ma et al. |
| 10,523,886 B2* | 12/2019 | Fossum .................. H04N 25/78 |
| 2018/0091748 A1* | 3/2018 | Yan ........................ H04N 25/63 |
| 2020/0371261 A1* | 11/2020 | Maruno ............... H04N 25/772 |

OTHER PUBLICATIONS

International Search Report and and Written Opinion from PCT/US2022/054105 dated Apr. 14, 2023, Gigajot Technology, Inc., pp. 1-15.

Abhiram Gnanasambandam, et al., "Megapixel Photon-Counting Color Imaging Using Quanta Image Sensor," ArXiv.org Cornell University Library, Mar. 21, 2019, pp. 1-13, XP081377438.

Fossum Eric R, "Photon Counting Error Rates in Single-Bit and Multi-Bit Quanta Image Sensors," IEEE Journal of the Electron Devices Society, IEEE USA, vol. 4, No. 3, May 1, 2016, pp. 136-143, XP011607397.

International Preliminary Report on Patentability from PCT/US2022/054105 dated Jul. 11, 2024, Gigajot Technology, Inc., pp. 1-9.

* cited by examiner

IMAGE SENSORS WITH ON-CHIP ADC DATA COMPRESSION FOR MULTI-BIT ELECTRON-NUMBER OUTPUTS

This application claims benefit of priority of U.S. Provisional Application Ser. No. 63/294,263, entitled "Image Sensors with On-Chip ADC Data Compression for Multi-Bit Electron-Number Outputs", filed Dec. 28, 2021, which is hereby incorporated in reference herein in its entirety.

BACKGROUND

Technical Field

This disclosure relates generally to an image sensor and more specifically to design of on-chip image signal processing circuits of an image sensor.

Description of the Related Art

Image capturing devices, such as cameras, are widely used in various electronic devices, such as mobile devices (e.g., smart phones, tablets, laptops, etc.), robotic equipment, or security monitoring devices, among others. An image capturing device may include an image sensor having a plurality of light-gathering pixels. A pixel may include a photodiode. The image capturing device may capture light from an environment and pass the light to the image sensor. When exposed to light, the photodiodes of the pixels may accumulate photoelectrons. At readout, the photoelectrons may transfer out of the photodiodes and generate analog image signals. The image sensor may also include one or more image signal processing circuits which may process the analog image signals to digital image signals and transfer them to an image signal processor. The image signal processor may further process the digital image signals to produce images.

Figure 1:
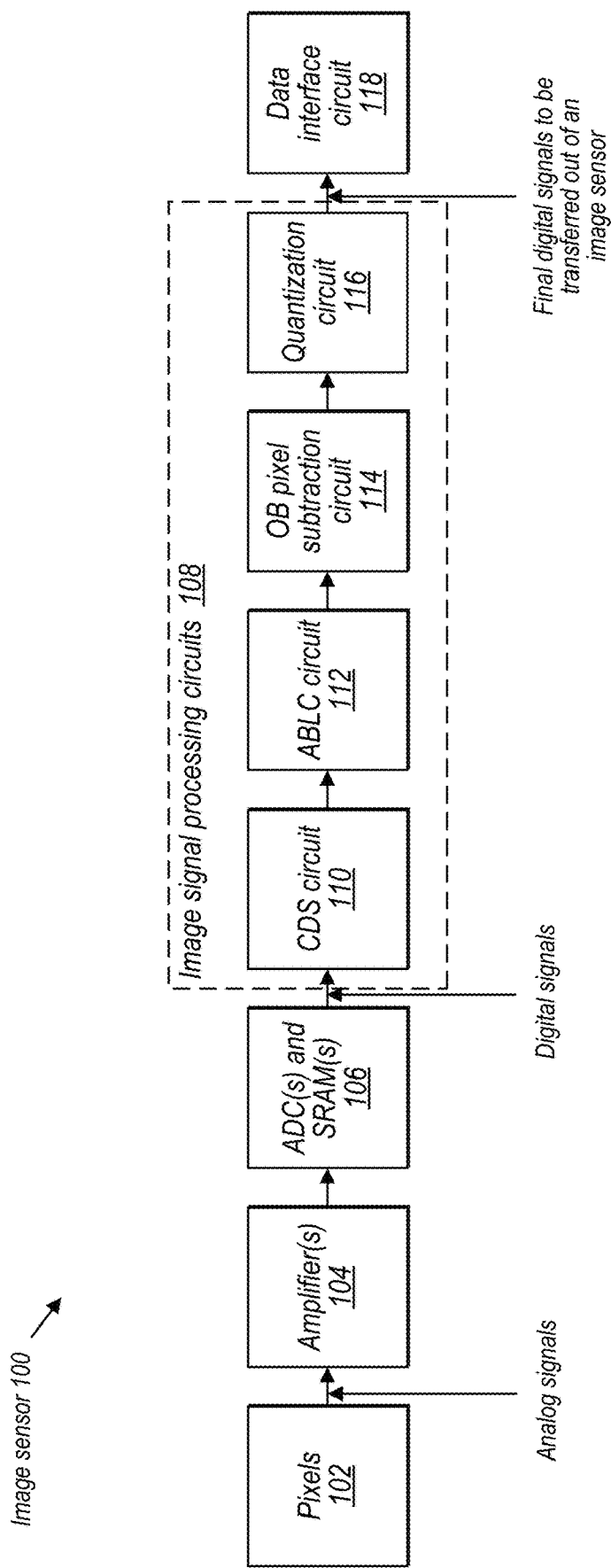
FIG. 1 is a schematic diagram showing an example image signal processing system of an image sensor, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to one or more image signal processing circuits of an image sensor. In some embodiments, the image sensor may include a plurality of light-gathering pixels. At least some pixels may each include at least one photodiode and one or more readout circuits. In some embodiments, the signal readout circuits may be formed using one or more transistors. The photodiodes may generate and accumulate photoelectrons when exposed to light. At readout, the photoelectrons may transfer out of the photodiodes, e.g., using the readout circuits, to generate analog image signals. In some embodiments, the image sensor may include one or more image signal processing circuits. The image signal processing circuits may process the analog image signals from the pixels to digital image signals. In some embodiments, the digital image signals may be transferred from the image sensor to one or more devices external to the image sensor, e.g., an image signal processor (ISP). The ISP may further process the digital image signals to generate one or more images. In some embodiments, the image sensor may be implemented using one or more integrated circuits on a semiconductor die. In some embodiments, the image sensor may be part of an image capturing device, such as a camera, and the image capturing device may be part of an electronic device, such as a mobile device (e.g., a smart phone, tablet, laptop, etc.), robotic equipment, or a security monitoring device, among others.

In some embodiments, the image signal processing circuits may include one or more analog-to-digital conversion (ADC) circuits which may convert the analog image signals of the pixels to digital image signals. In some embodiments, the image signal processing circuits may further include one or more darkness correction circuits, such as an auto black level correction (ABLC) circuit and an optical black (OB) pixel subtraction circuit. In some embodiments, the ABLC circuit may correct darkness associated with the digital image signals of pixels on multiple rows or columns (e.g., pixels on all rows or columns of an image sensor), whereas the OB pixel subtraction circuit may correct blackness associated with the digital image signals of pixels on single row or column. In the disclosure, the ABLC and/or OB pixel subtraction circuits may be described with regards to rows or columns, because the pixels are generally organized into a pixel array and their image signals are read out and processed in groups row-by-row or column-by-column.

In some embodiments, the ABLC circuit may determine a value representing a black level based on the values of digital image signals from pixels within a dark (or black) region of the image sensor. In some embodiments, these pixels may be optically and/or electrically shielded from the incident photons, and thus produce image signals only at very low values, e.g., below a threshold. For purposes of illustration, these pixels are also referred to as black pixels in the disclosure. In some embodiments, the black pixels may reside in a region covering multiple rows or columns of the pixel array of an image sensor. The image signals from these black pixels may provide a representation of noises (e.g., thermal noises and/or other system noises), and their values may determine the darkness level of an image. For example, when their values fluctuate, the overall image may become darker or lighter. To compensate for these noise effects, the ABLC circuit may subtract the determined value that represents the black level from the values of digital image signals of active (or non-black) pixels to thus cancel out the dark level from these active pixels' output. By comparison, the OB subtraction circuit may operate similarly but with respect to pixels on a single row or column. For examples, given one row, the OB pixel subtraction circuit may determine a value representing a black level of this row based on the digital image signals of black pixels on this row, and then subtract the value from values of the digital image signals from the active (or non-black) pixels on the row. Thus, if the ABLC circuit may be considered to provide black correction on a "global" level of an image sensor, the OB pixel subtraction circuit may be considered to provide black correction on a "local" level on each row or column.

In some embodiments, the digital image signals may be divided into a first set of digital image signals and a second set of digital image signals. The first set of digital image signals may each have a value corresponding to an integer number of photoelectrons, whereas the second set of image digital signals may each have a value between the values of the first subset of digital signals so as to correspond to a non-integer number of photoelectrons. Given that photoelectrons are discrete particles, in an ideal case, the digital image signals may include only the first set of digital image signals, without the second set of digital image signals. In some embodiments, the second set of digital image signals may be caused by noises, such as thermal noises (e.g., caused by temperature variation) and/or other system noises. In some embodiments, the second set of digital image signals may be useful for the above described darkness correction, because they provide the signal precision for the small values of image signals of black pixels. However, once these image signal processing is complete, the second set of digital image signals may not necessarily provide additional useful information as to the final image generation and displaying.

Thus, in some embodiments, the image signal processing circuits of the image sensor may include a quantization circuit which may further quantize the digital image signals. In some embodiments, the quantization circuit may convert the second set of digital image signals to a third set of digital image signals, and the third set of digital image signals may each have a value corresponding to an integer number of photoelectrons. In some embodiments, to perform the conversion, the quantization circuit may compare the value of each one of the second set of digital image signals with one or more thresholds. Based on the comparison, the quantization circuit may identify a (new) value to replace the (original) value of the digital image signal to thus generate a (new) digital signal to form the third set of digital image signals. The further quantized digital signal may have less bit depth so that the data throughput is compressed.

One with skills in the art shall understand the disclosed image signal processing circuits can provide several benefits. For example, with the conversion, the values of the second set of digital image signals (corresponding to non-integer numbers of discrete photoelectrons) may be replaced with values of the third set of digital image signals (corresponding to integer numbers of discrete photoelectrons) or may be eliminated (e.g., when they are smaller than a specific threshold). This may thus reduce the size of digital image signals to be transferred from an image sensor to the external devices, e.g., an image signal processor. The data compression may increase data transfer rate and accelerate downstream image generation and processing. In addition, as described above, the second set of digital image signals may be caused by noises. Thus, the conversion of their values may be considered correction of non-ideal noisy image signals. This may improve the image signals quality and increase clarity and/or sharpness of the ultimately produced images.

FIG. 1 is a schematic diagram showing an example image signal processing system of an image sensor, according to some embodiments. As shown in FIG. 1, image sensor 100 may include a plurality of light-gathering pixels 102. In some embodiments, at least some of pixels 102 may each include at least one photodiode and one or more readout circuits. In some embodiments, the readout circuits may be formed using one or more transistors. The photodiodes may generate and accumulate photoelectrons when exposed to light. At readout, the photoelectrons may transfer out of the photodiodes, e.g., using the readout circuits, to generate analog image signals (e.g., analog voltages). For example, in some embodiments, for a given pixel, at readout, using the readout circuits, the at least one photodiode of the pixel may become coupled with a floating diffusion region (hereinafter "FD"). The photoelectrons may transfer from the photodiode to the FD. The FD may have capacitance, and transfer of the photoelectrons may cause a current to flow through the capacitance and thus generate an analog voltage. The FD may be further coupled with a pixel signal output line (hereinafter "output"), through which the voltage of the FD may be accessed and sampled.

As shown in FIG. 1, in some embodiments, image sensor 100 may also include one or more amplifiers 104, and one or more analog-to-digital conversion (ADC) circuits and memory (e.g., volatile (e.g., SRAM) or non-volatile memory) 106. In some embodiments, amplifiers 104 may amplify the analog image signals of pixels 102, whereas ADC circuits and memory 106 may convert the image signals from analog signals to digital signals and store them in the memory. As described above, in some embodiments, pixels 102 of image sensor 100 may be organized into a pixel array having multiple rows and columns. In some embodiments, the image signals of pixels 102 may be read out in groups row-by-row or column-by-column. For example, using the row-by-row readout, pixels 102 on the same row may be read out at or around the same time, whereas pixels 102 on the same column but different rows may be read out sequentially one row after another. The column-by-column readout may be similar except that readout with respect to the rows and columns are exchanged.

In some embodiments, image sensor 100 may also include one or more image signal processing circuits 108. As shown in FIG. 1, in some embodiments, image signal processing circuits 108 may include at least one CDS circuit to perform correlated double sampling (CDS) calculations. With CDS, the analog image signal of each pixel may be sampled twice at the output to generate two digital values, one before and one after the transfer of photoelectrons. Then, the first sample may be subtracted from the second sample to cancel out effects of a reset voltage (of the FD). The final differential value may be considered the final digital signal value of the pixel.

In some embodiments, image signal processing circuits 108 may also include one or more darkness correction circuits. As shown in FIG. 1, in some embodiments, image signal processing circuits 108 may include at least one ABLC circuit 112. As described above, in some embodiments, ABLC circuit 112 may correct darkness associated with the digital image signals of pixels 102 on multiple rows or columns (e.g., pixels on all rows or columns of image sensor 100). In some embodiments, ABLC circuit 112 may identify a plurality of black pixels of pixels 102 that reside within one or more dark (or black) regions of image sensor 100. These black pixels may be identified because the values of their digital image signals may be less than a threshold. In some embodiments, ABLC circuit 112 may calculate an average value of these digital image signals, which may be considered representing the average black level. ABLC circuit 112 may then subtract the average value from the values of digital image signals of other active (or non-black) pixels to thus cancel out the average black level.

As shown in FIG. 1, in some embodiments, image signal processing circuits 108 may also include at least one OB pixel subtraction circuit 114. In some embodiments, OB pixel subtraction circuit 114 may operate similarly to above described ABLC circuit 112, but with respect to pixels on a single row or column. For example, given one row, OB pixel subtraction circuit 114 may identify black pixels on the row and then calculate an average from their digital image signals to represent black color of this row. OB pixel subtraction circuit 114 may then subtract this value from the values of digital image signals of other active (or non-black) pixels on the row. The same operations may be repeated on each row (or column) to thus compensate for the darkness row-by-row (or column-by-column).

In some embodiments, ABLC circuit 112 and OB pixel subtraction circuit 114 may be used in combination within image sensor 100 to provide darkness correction, as shown in FIG. 1. In that case, ABLC circuit 112 may subtract the average value representing the overall darkness level from also the values of digital image signals of the black pixels, such that only the remaining values (after the ABLC correction) of the black pixels (for each row or column) may be used by OB pixel subtraction 114 to correct darkness. This may avoid over-correction at the subsequent row or column level. Note that FIG. 1 is provided only as an example for purposes of illustration. In some embodiments, image signal processing circuits 108 may include less or more circuits. For example, in some embodiments, image signal processing circuits 108 may include the defect pixel correction (DPC) circuit, digital gain (DG) circuit, etc.

As described above, in some embodiments, the digital image signals of image sensor 100 (before or after the above described image signal processing of 110, 112, and/or 114) may include a first set of digital image signals and a second set of digital image signals. In some embodiments, the first set of digital image signals may each have a value corresponding to an integer number of photoelectrons, whereas the second set of image digital signals may each have a value between the values of the first set of digital signals and thus correspond to a non-integer number of photoelectrons. In some embodiments, the second set of digital image signals may be useful for darkness correction, because they provide the signal precision for the small values of image signals of black pixels. However, given that the photoelectrons are discrete particles, the second set of digital image signals may not have values necessarily corresponding to "real" photoelectrons. Thus, once the above described image signal processing is complete, the second set of digital image signals may not provide additional useful information as to the final image generation and displaying As shown in FIG. 1, in some embodiments, image signal processing circuit 108 may include quantization circuit 116 to further quantize the digital image signal. In some embodiments, quantization circuit 116 may convert the second set of digital signals to a third set of digital image signals, and the third set of digital image signals may each have a value corresponding to an integer number of discrete photoelectrons. As described in detail below, in some embodiments, to perform the conversion, for each one of the second set of digital signals, quantization circuit 116 may compare the value of the digital signal with a threshold. Based on the comparison, quantization circuit 116 may identify a (new) value to replace the (original) value of the digital signal to thus generate a (new) digital signal to form the third set of digital image signals.

As shown in FIG. 1, in some embodiments, image sensor 100 may also include data interface 118, through which the digital image signals including the first and third sets of digital image signals both only having values corresponding to integer numbers of discrete photoelectrons may be transferred from image sensor 100 to one or more devices external to image sensor 100, e.g., an image signal processor (ISP). The ISP may further process these digital images to finally reconstruct and generate one or more images.

Figure 2:
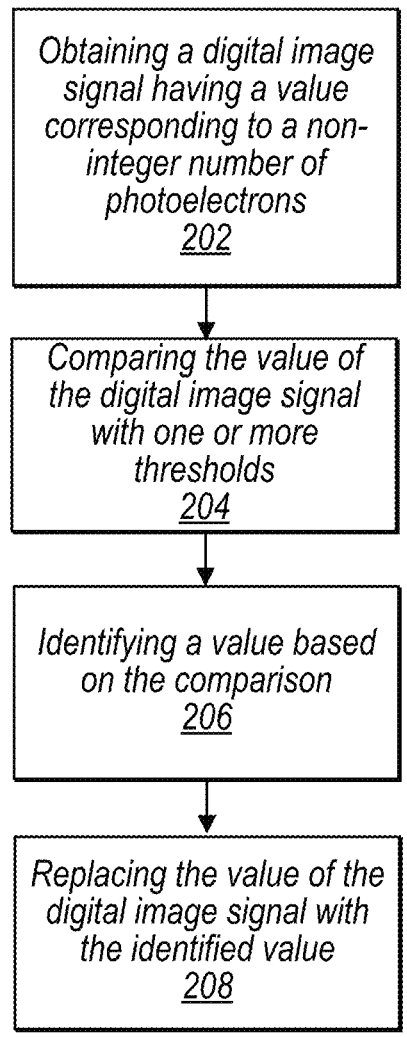
FIG. 2 is a flowchart showing an example method for converting one set of digital image signals to another set of digital image signals, according to some embodiments.

FIG. 2 is a flowchart showing an example method for converting one set of digital image signals to another set of digital image signals, according to some embodiments. In FIG. 2, in some embodiments, a digital image signal (e.g., one of the above described second set of digital image signals) having a value corresponding to a non-integer number of discrete photoelectrons may be obtained (e.g., by quantization circuit 116) as shown in block 202. In some embodiments, the value of the digital image signal may be compared with one or more thresholds, as shown in block 204. In some embodiments, based on the comparison, a new value may be identified, as shown in block 206. For example, in some embodiments, the threshold may be value between two values (e.g., a and b) each corresponding to an integer number of discrete photoelectrons. In some embodiments, a and b may be the two closest values (each corresponding to an integer numbers of photoelectrons) to the original value of the digital image signal (corresponding to a non-integer number of photoelectrons). In the comparison, when the value of the digital image signal is determined larger than the threshold, the larger one of a and b may be identified as the new value. Conversely, when the value of the digital image signal is not larger than the threshold, the smaller one of a and b may be identified as the new value. In some embodiments, the original value of the digital image signal may be replaced with the identified new value, as shown in block 208. As described above, in some embodiments, the original value of the digital image signal may be replaced with one of the two values (e.g., a and b) based on the comparison. In other words, the original value may be rounded up or down to one of the closest values corresponding to an integer number of photoelectrons. In addition to replacement, in some embodiments, other implementations may be utilized to convert the non-integer digital image signals, such as division, multiplication, addition, subtraction, bit shifting, etc. For example, a non-integer value of 0.12 may be quantized to 1 via 3-bit shift (e.g., multiplied by 8) in combination with further addition and/or other arithmetic operations.

Figure 3:
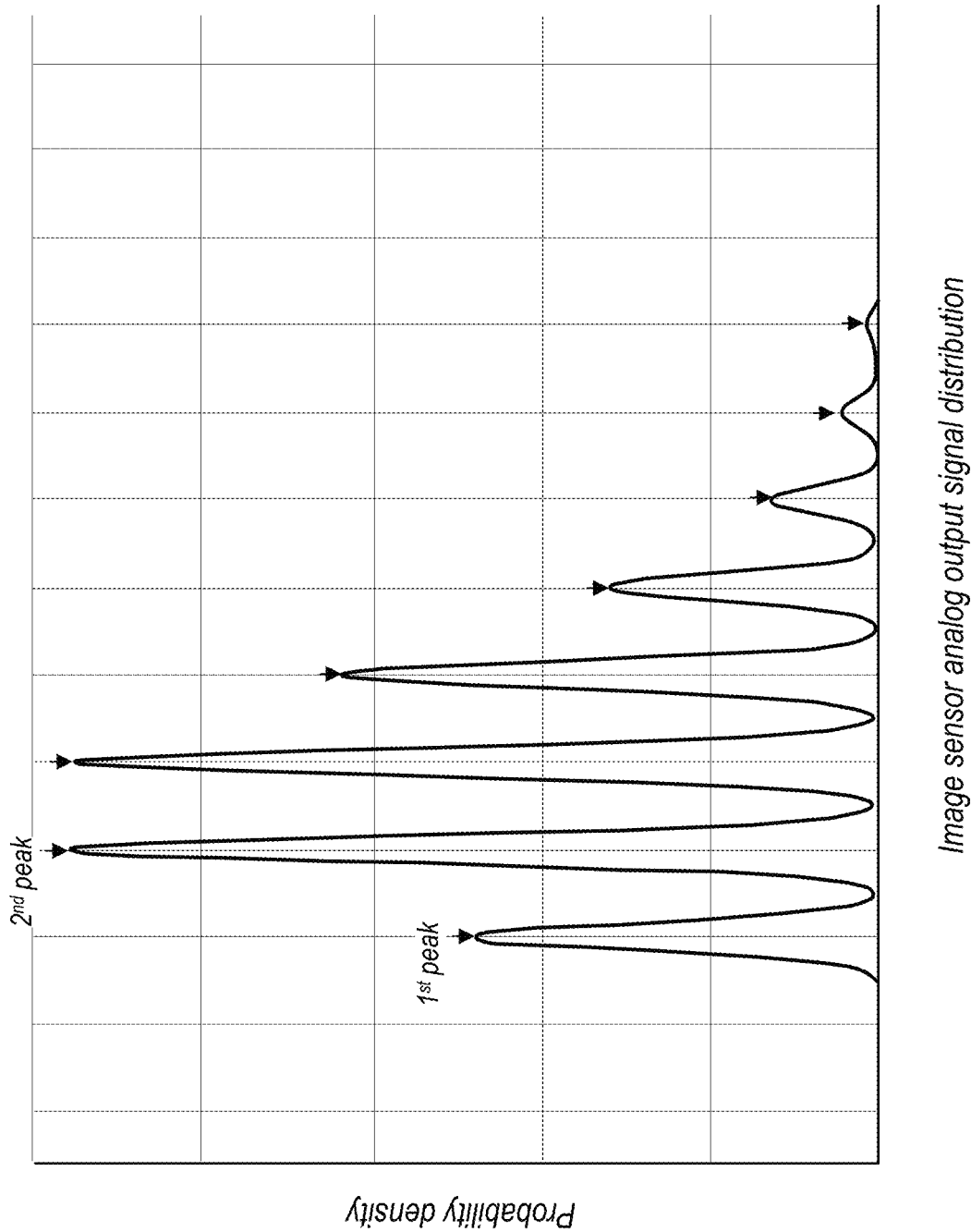
FIG. 3 shows an example probability distribution of analog image signals of an image sensor, according to some embodiments.

FIG. 3 shows an example probability distribution of analog image signals of an image sensor, according to some embodiments. For example, the diagram of FIG. 3 may represent the probability distribution of values of the analog image signals of FIG. 1 (before or after the image signal processing of 110, 112, and/or 114). In FIG. 3, the horizontal axis represents values of the analog image signals, whereas the vertical axis represents probability densities of the values. As shown in FIG. 3, the diagram may include several peaks, and each peak may correspond to an analog image signal corresponding to an integer number of photoelectrons. Since photoelectrons are discrete particles, these values may appear as peaks in the diagram. For example, the $1^{st}$ peak from the left may represent analog image signals having values corresponding to an integer (m) number of discrete photoelectrons, the $2^{nd}$ peak from the left may represent analog image signals having values corresponding to an integer (n) number of discrete photoelectrons, and so on. In FIG. 3, the diagram may also include some non-peak values between the peak values. These values may represent analog image signals having values corresponding to non-integer numbers of photoelectrons. As described above, in some embodiments, these signals may be caused by noises and thus tend to have values less than the peak. Thus, they show up as values between the peak values and surround the peak values following a Poisson-Gaussian distribution, for example. In some embodiments, the more the noise effects, the more these non-peak values, the wider the Poisson-Gaussian distribution curves, and eventually the Poisson-Gaussian curves of the peaks may become overlapped with each other.

Figure 4:
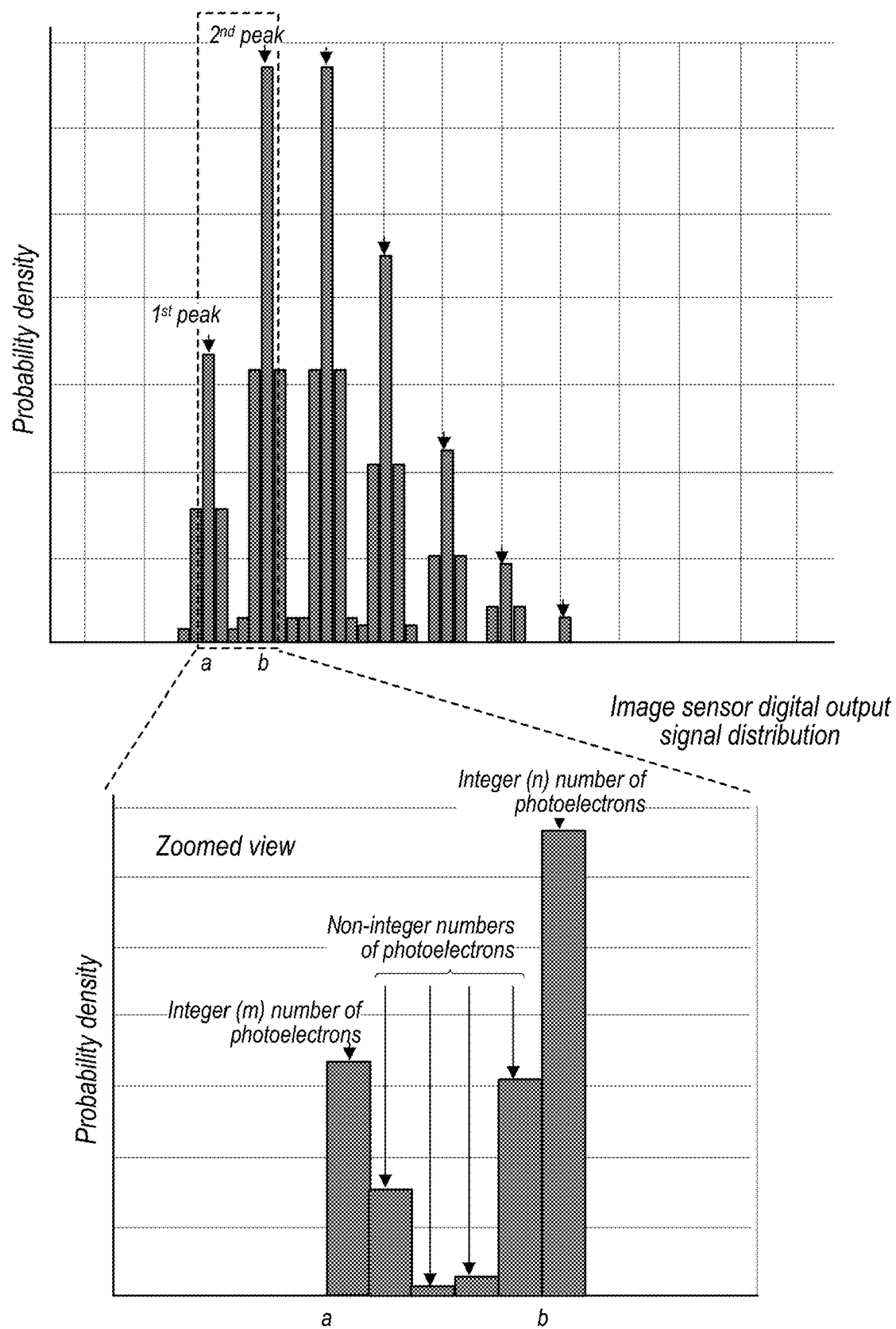
FIG. 4 shows an example probability distribution of digital image signals of an image sensor, according to some embodiments.

FIG. 4 shows an example probability distribution of digital image signals of an image sensor, e.g., the analog image signals of FIG. 3 after amplification (e.g., by amplifiers 104) and digitalization (e.g., by ADC circuits 106), according to some embodiments. As shown in FIG. 4, in the diagram of FIG. 4 is similar to the diagram of FIG. 3 except that values of FIG. 4 are quantized from analog signals to discrete digital values. A zoomed view of the diagram between the values a and b is shown at the bottom of FIG. 4. As shown in the zoomed view, the digital image signals may include a first set of digital image signals, e.g., the two peaks at a and b each having a value corresponding to an integer number of discrete photoelectrons. For example, the $1^{st}$ peak at value a may correspond to an integer (m) number of discrete photoelectrons, and the $2^{nd}$ peak at value b may correspond to an integer (n) number of discrete photoelectrons. The digital image signals in the zoomed view may also include a second set of digital image signals, e.g., the non-peak values between the two peaks of a and b. Thus, these values may be considered corresponding to non-integer numbers of discrete photoelectrons. As described above, in some embodiments, an image sensor (e.g., image sensor 100) may use a quantization circuit (e.g., quantization circuit 116) to convert these non-integer values each corresponding to a non-integer number of discrete photoelectrons) to values corresponding to integer numbers of discrete photoelectrons. For example, assuming a and b are the two closest values corresponding to integer numbers of discrete photoelectrons, the quantization circuit may compare the non-integer values with a threshold having a value of (a+b)/2. When a non-integer value is larger than the threshold, the quantization circuit may round up the non-integer value to b. Conversely, when a non-integer value is not larger than the threshold, the quantization circuit may round down the non-integer value to a. In some embodiments, the quantization circuit may use different thresholds to convert non-integer values residing within different ranges. For example, if the closest peaks change from (a, b) to (c, d), a different threshold may be used to perform the conversion of the non-integer values.

Figure 5:
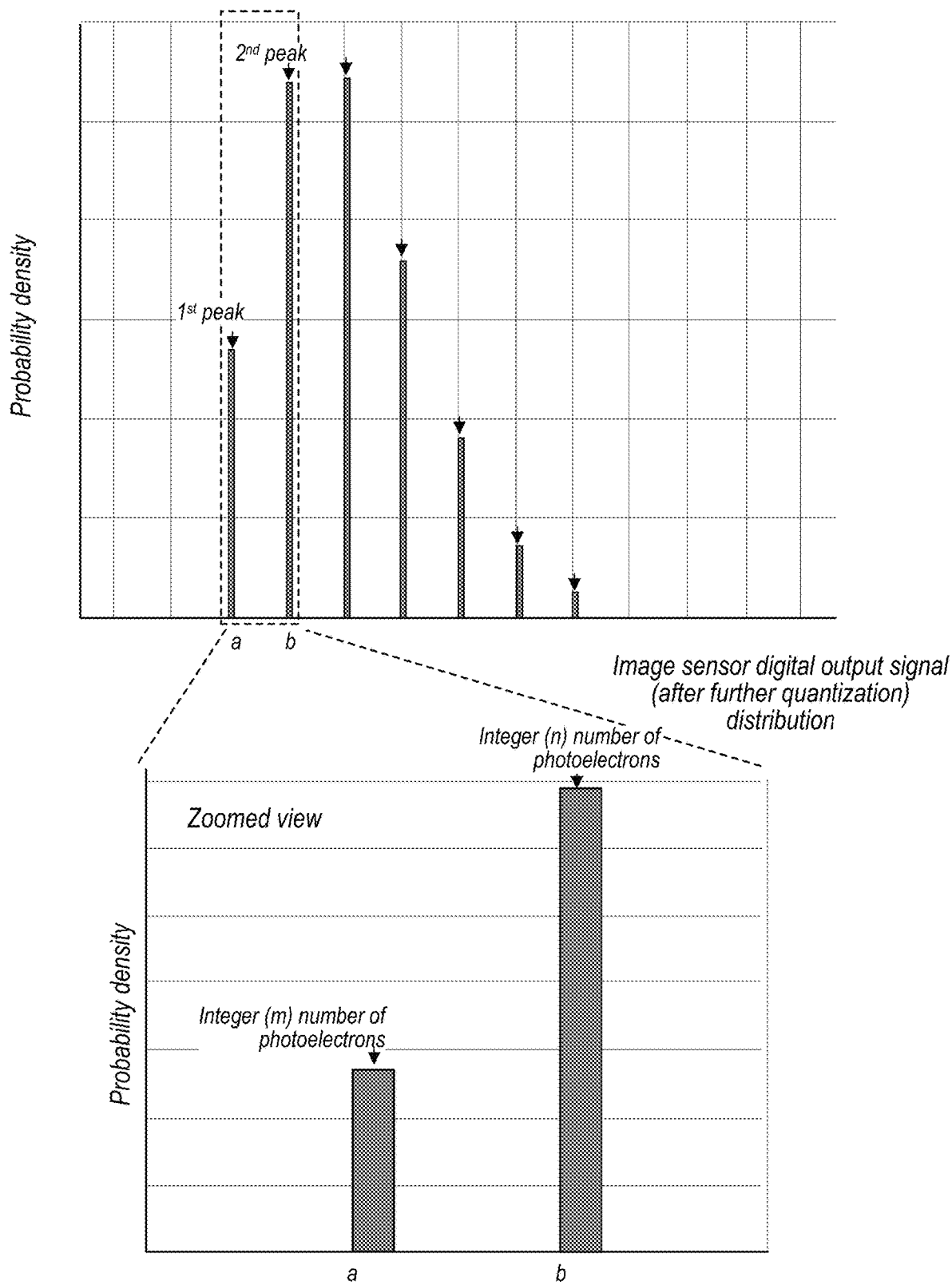
FIG. 5 shows an example probability distribution of digital image signals of an image sensor with additional quantization, according to some embodiments.

FIG. 5 shows an example probability distribution of digital image signals of an image sensor, e.g., the digital image signals after further quantization of FIG. 1 (by quantization circuit 116), according to some embodiments. As shown in FIG. 5, the non-peak values (corresponding to non-integer numbers of discrete photoelectrons) of FIG. 4 are converted to integer values and thus disappear in FIG. 5. Also, as shown in the zoomed view of FIG. 5, the conversion of the non-integer values to integer values may cause changes of the probability densities of peak values (corresponding to integer numbers of discrete photoelectrons) compared to FIG. 4.

In some embodiments, the above described quantization circuit 116 of image sensor 100 may be deactivated so that quantization circuit 116 may retain the values of the second set of digital image signals, without converting them to the second set of digital image signals to the third set of digital image signals having values corresponding to integer numbers of discrete photoelectrons. Alternatively, in some embodiments, image sensor 100 may have a bypass circuit, which when activated may enable to the digital image signals (including the second set of digital image signals) to bypass quantization circuit 116, so that the second set of digital image signals may not be converted to the third set of digital image signals. In some embodiments, image sensor 100 may separate the second set of digital image signals from the first set of digital image signals and transfer the second set of digital image signals from image sensor 100 to one or more external devices. For example, in some embodiments, the second set of digital image signals may be transferred and thus available from image sensor 100, based on which the value(s) of the threshold(s) for the conversion may be determined. In another example, the second set of digital image signals may be used for one or other more purposes, e.g., noise analysis, calibration, testing, etc.

Figure 6:
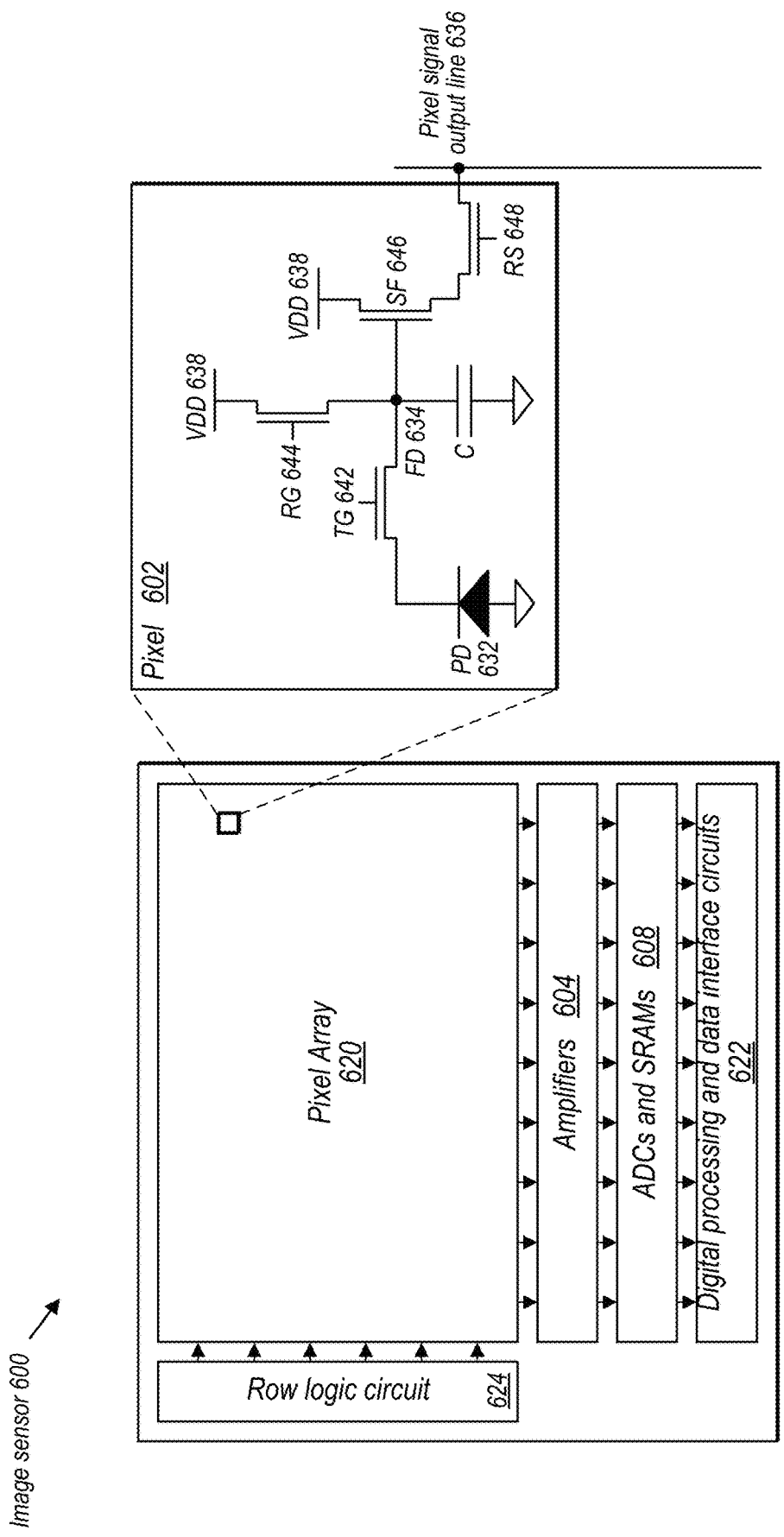
FIG. 6 is a schematic diagram of an example image sensor including at least one disclosed quantization circuit, according to some embodiments.

FIG. 6 is a schematic diagram of an example image sensor including the above described quantization circuit, according to some embodiments. As shown in FIG. 6, image sensor 600 may include a plurality of light-gathering pixels 602 (e.g., similar to pixels 102) organized as a pixel array 620. In some embodiments, image sensor 600 may include one or more amplifiers 604 (e.g., similar to amplifiers 104 of FIG. 1), one or more ADC circuits and memory 608 (e.g., similar to ADC circuits and memory 104), and one or more image signal processing and data interface circuits 622 (e.g., including image signal processing circuits 108 and data interface circuit 118). As described above, in some embodiments, image signals of pixels 602 of pixel array 602 may be read out row-by-row or column-by-column. For purposes of illustration, in this example, image sensor 600 may also include row logic circuit 624 to provide control signals to perform row-by-row readout of pixels 602. As described above, using the row-by-row readout, pixels 602 on the same row may be read out at or around the same time, whereas pixels 602 on the same column but different rows may be read out sequentially one row after another.

In some embodiments, the above readout of image signals of pixels 602 may be implemented using one or more readout circuits, e.g., implemented using transistors. For example, as shown in FIG. 6, in some embodiments, at least some of pixels 602 may each include at least one photodiode 632 and transistors 642, 644, 646, and 648. Photodiode 632 may generate and accumulate photoelectrons when exposed to light. During readout, under control signals from row logic circuit 624, row selection transistor ("RS") 648, source follower transistor ("SF") 646, and reset gate transistor ("RG") 644 may be turned on. Thus, reset voltage VDD 638 may be coupled with floating diffusion region ("FD") 634, and FD 634 may be coupled with pixel signal output line ("output") 636. The voltage of FD 634 (e.g., having a value of reset voltage VDD) may be amplified by amplifiers 604, sampled by ADC circuits 608, and stored by memory 608. As described above, this may be the first sample of the CDS (correlated double sampling). Then, under control signals from row logic circuit 624, RG 644 may be turned off, and transfer gate transistor ("TG") 642 may be turned on. Thus, the photoelectrons of photodiode 632 may transfer out of photodiode 632 to capacitance C of FD 634. The transfer of photoelectrons may cause a current flowing through the capacitance C and thus result in an analog voltage, which may be further amplified by amplifiers 604, sampled by ADC circuits 608, and stored by memory 608. As described above, this may be the second sample of the CDS. Thus, a CDS circuit (e.g., similar to CDS circuit 110), as part of image signal processing and data interface circuits 622, may subtract the first sample from the second sample to cancel out effects of reset voltage VDD 638 to determine the final digital signal value of the pixel 602. The above described operations may be repeated on different pixels, e.g., according to the rows or columns.

As described above, in some embodiments, image signal processing and data interface circuits 622 may include one or more darkness correction circuits (e.g., ABLC circuit 112 and/or OB pixel subtraction circuit 114 of FIG. 1), and at least one quantization circuit (e.g., quantization circuit 116). In some embodiments, the quantization circuit may further quantize the digital image signals of pixels 602, and convert values of the digital image signals corresponding to non-integer number of discrete photoelectrons to values corresponding to integer numbers of discrete photoelectrons. Also, as described above, in some embodiments, the conversion may include rounding up or down the non-integer values to closest integer values. In some embodiments, image sensor 600 (including the above described components) may be implemented using one or more integrated circuits on a semiconductor die.

Figure 7:
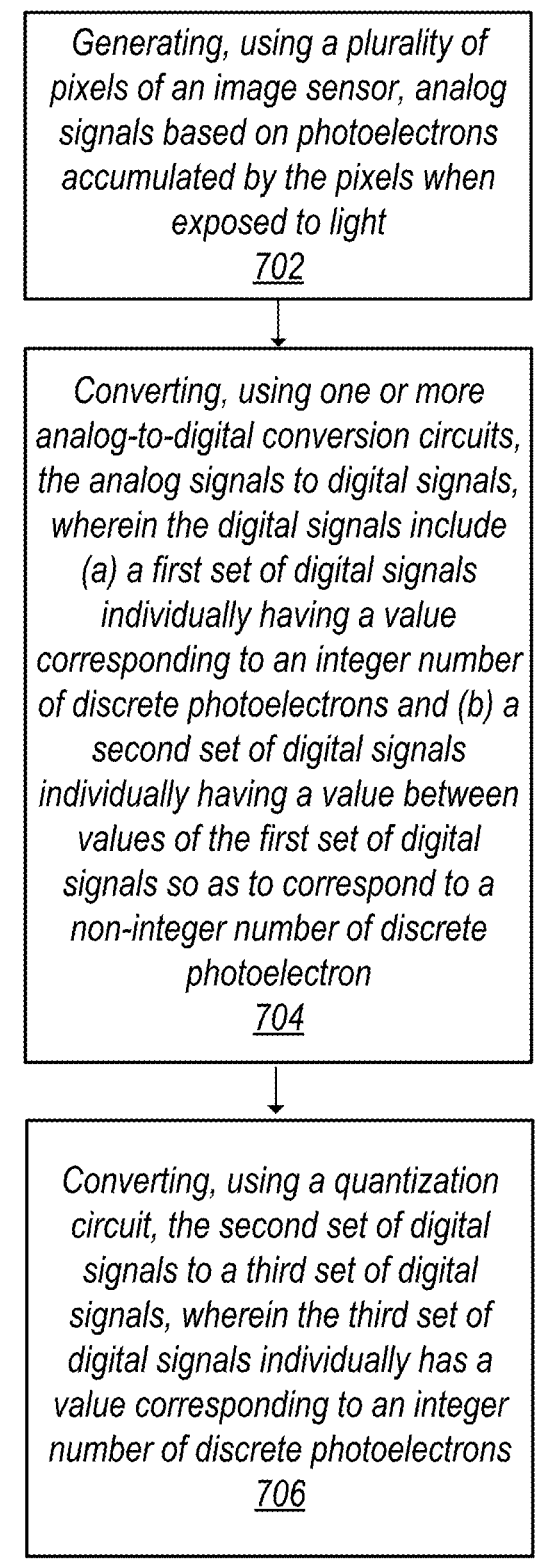
FIG. 7 is a flowchart showing an example method for processing image signals of an image sensor, according to some embodiments.

FIG. 7 is a flowchart showing an example method for processing image signals of an image sensor, according to some embodiments. In FIG. 7, in some embodiments, analog image signals may be generated using a plurality of pixels (e.g., the light-gathering pixels described above) based on photoelectrons accumulated by the pixels when exposed to light, as shown by block 702. For example, as described above, when exposed to light, the photodiodes of the pixels may generate and accumulate photoelectrons. During readout, these photoelectrons may transfer out of the photodiodes to generate analog voltage signals at FD regions of the pixels, which may be further accessed at the output of the pixels. In FIG. 7, in some embodiments, the analog image signals (e.g., the analog voltage signals) may be converted, using one or more ADC circuits (e.g., the ADC circuits described above), to digital signals, wherein the digital signals include (a) a first set of digital signals individually having a value corresponding to an integer number of discrete photoelectrons and (b) a second set of digital signals individually having a value between values of the first set of digital signals so as to correspond to a non-integer number of discrete photoelectron, as shown by block 704. As described above in FIGS. 3-4, the analog image signals and the subsequently converted digital image signals may include a first set of peak values each corresponding to an integer number of discrete photoelectrons (accumulated by and transferred out of photodiodes) and a second set of non-peak value each corresponding to a non-integer number of discrete photoelectrons. In FIG. 7, in some embodiments, the second set of digital signals may be converted, e.g., using a quantization circuit (e.g., the quantization circuits described above), to a third set of digital signals, wherein the third set of digital signals individually has a value corresponding to an integer number of discrete photoelectrons, as shown by block 706. As described above in FIG. 5, the second set of non-peak values may be converted to a third set of values each corresponding to an integer number of discrete photoelectrons.

Figure 8:
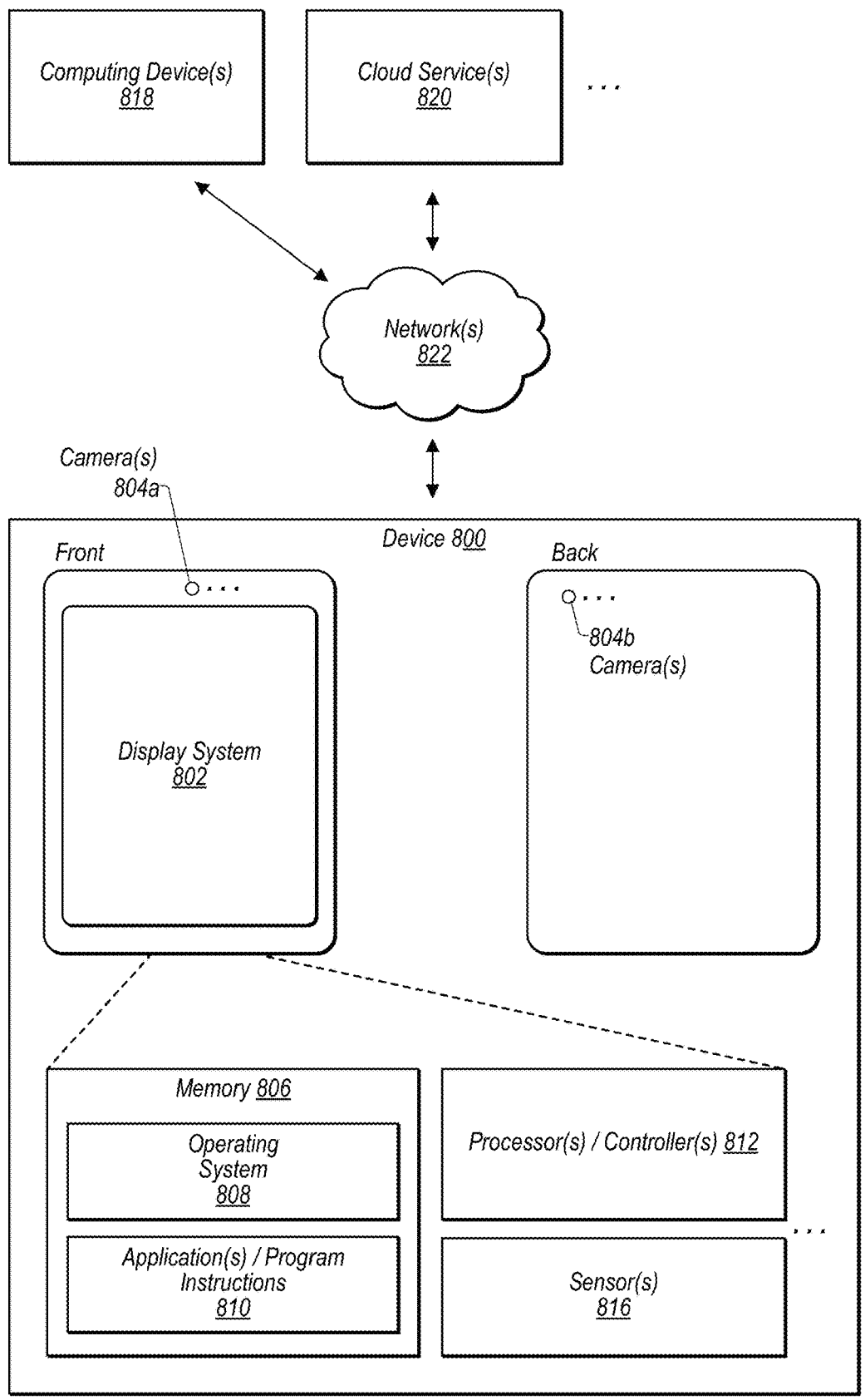
FIG. 8 illustrates a schematic representation of an example device that may include an image capturing device (e.g., a camera) having an image sensor that includes at least one disclosed quantization circuit, according to some embodiments.

FIG. 8 illustrates a schematic representation of an example device 800 that may include an image capturing device (e.g., a camera) having an image sensor that includes at least one above-described quantization circuit, according to some embodiments. In some embodiments, the device 800 may be a mobile device and/or a multifunction device. In various embodiments, the device 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 800 may include a display system 802 (e.g., comprising a display and/or a touch-sensitive surface) and/or one or more cameras 804. In some non-limiting embodiments, the display system 802 and/or one or more front-facing cameras 804a may be provided at a front side of the device 800, e.g., as indicated in FIG. 8. Additionally, or alternatively, one or more rear-facing cameras 804b may be provided at a rear side of the device 800. In some embodiments comprising multiple cameras 804, some or all of the cameras may be the same as, or similar to, each other. Additionally, or alternatively, some or all of the cameras may be different from each other. In various embodiments, the location(s) and/or arrangement(s) of the camera(s) 804 may be different than those indicated in FIG. 8.

Among other things, the device 800 may include memory 806 (e.g., comprising an operating system 808 and/or application(s)/program instructions 810), one or more processors and/or controllers 812 (e.g., comprising CPU(s), memory controller(s), display controller(s), and/or camera controller (s), etc.), and/or one or more sensors 816 (e.g., orientation sensor(s), proximity sensor(s), and/or position sensor(s), etc.). In some embodiments, the device 800 may communicate with one or more other devices and/or services, such as computing device(s) 818, cloud service(s) 820, etc., via one or more networks 822. For example, the device 800 may include a network interface (e.g., network interface 810) that enables the device 800 to transmit data to, and receive data from, the network(s) 822. Additionally, or alternatively, the device 800 may be capable of communicating with other devices via wireless communication using any of a variety of communications standards, protocols, and/or technologies.

Figure 9:
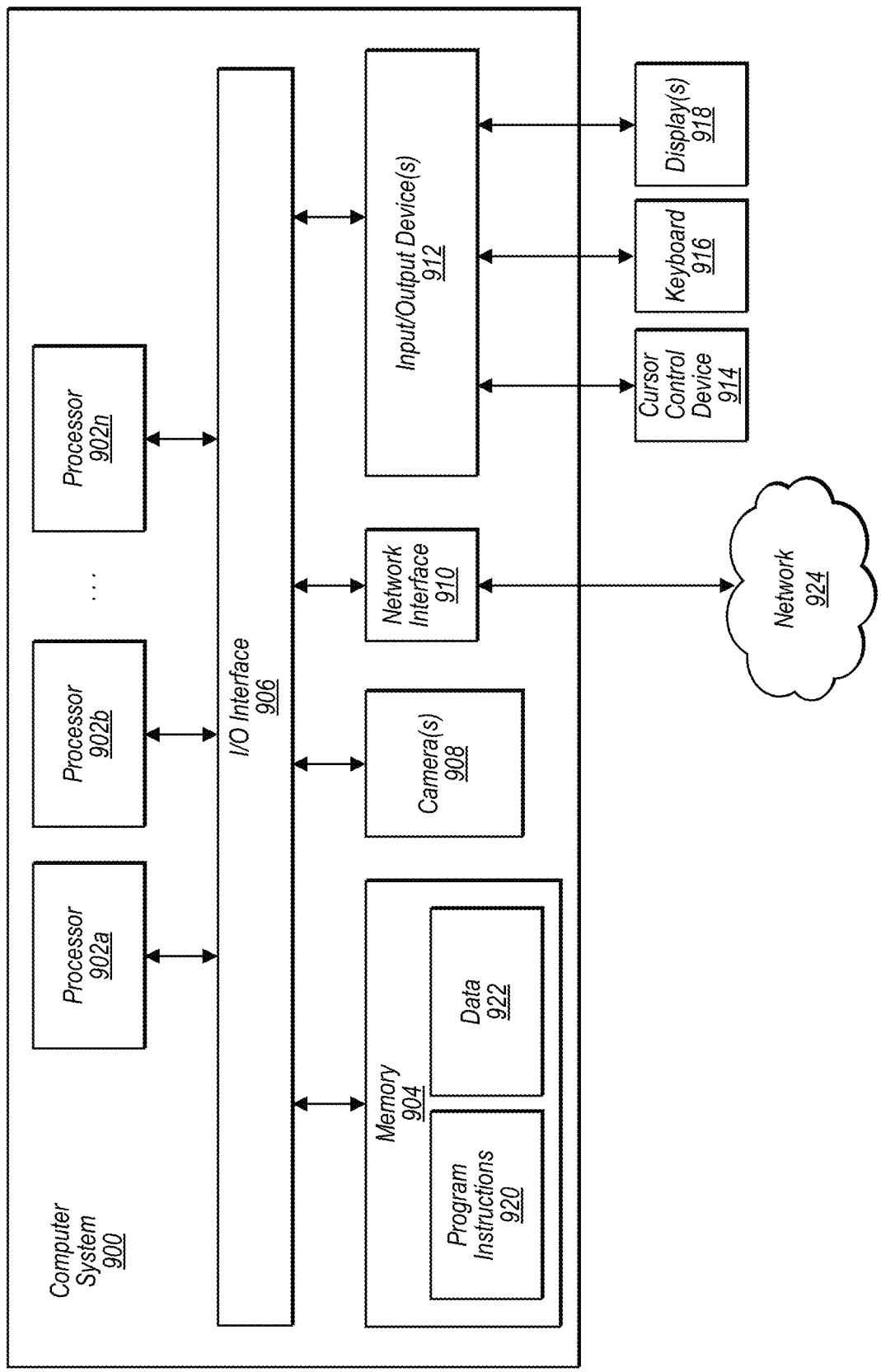
FIG. 9 illustrates a schematic block diagram of an example computing device that may include or host embodiments of an image capturing device (e.g., a camera) having an image sensor that includes at least one disclosed quantization circuit, according to some embodiments.

FIG. 9 illustrates a schematic block diagram of an example computing device, referred to as computer system 900, that may include or host embodiments of an image capturing device (e.g., a camera) having an image sensor that includes at least one above described quantization circuit, according to some embodiments. In addition, computer system 900 may implement methods for controlling operations of the camera and/or for performing image processing images captured with the camera. In some embodiments, the device 900 (described herein with reference to FIG. 9) may additionally, or alternatively, include some or all of the functional components of the computer system 900 described herein.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 900 includes one or more processors 902 coupled to a system memory 904 via an input/output (I/O) interface 906. Computer system 900 further includes one or more cameras 908 coupled to the I/O interface 906. Computer system 900 further includes a network interface 910 coupled to I/O interface 906, and one or more input/output devices 912, such as cursor control device 914, keyboard 916, and display(s) 918. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 902, or a multiprocessor system including several processors 902 (e.g., two, four, eight, or another suitable number). Processors 902 may be any suitable processor capable of executing instructions. For example, in various embodiments processors 902 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 902 may include additional types of processors, such as graphics processing units (GPUs), application specific integrated circuits (ASICs), etc. In multiprocessor systems, each of processors 902 may commonly, but not necessarily, implement the same ISA. In some embodiments, computer system 900 may be implemented as a system on a chip (SoC). For example, in some embodiments, processors 902, memory 904, I/O interface 906 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 904 may be configured to store program instructions 920 accessible by processor 902. In various embodiments, system memory 904 may be implemented using any suitable memory technology, such as static random access memory (SRAM), synchronous dynamic RAM (SDRAM), nonvolatile/Flash-type memory, or any other type of memory. Additionally, existing camera control data 922 of memory 904 may include any of the information or data structures to implement the techniques described above. In some embodiments, program instructions 920 and/or data 922 may be received, sent or stored upon different types of computer-accessible media or on similar media separate from system memory 904 or computer system 900. In various embodiments, some or all of the functionality described herein may be implemented via such a computer system 900.

In one embodiment, I/O interface 906 may be configured to coordinate I/O traffic between processor 902, system memory 904, and any peripheral devices in the device, including network interface 910 or other peripheral interfaces, such as input/output devices 912. In some embodiments, I/O interface 906 may perform any necessary protocol, timing or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments some or all of the functionality of I/O interface 906, such as an interface to system memory 904, may be incorporated directly into processor 902.

Network interface 910 may be configured to allow data to be exchanged between computer system 900 and other devices attached to a network 924 (e.g., carrier or agent devices) or between nodes of computer system 900. Network 924 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 910 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 912 may, in some embodiments, include one or more display terminals, keyboards, keypads, touchpads, scanning devices, voice or optical recognition devices, or any other devices suitable for entering or accessing data by one or more computer systems 900. Multiple input/output devices 912 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 910.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image sensor, comprising:
   a plurality of pixels configured to generate analog signals corresponding to a digital image based on photoelectrons accumulated by the pixels when exposed to light;
   one or more analog-to-digital conversion circuits configured to convert the analog signals to digital signals of the digital image, wherein the digital signals include (a) a first set of digital signals of the digital image individually having a value corresponding to an integer number of discrete photoelectrons and (b) a second set of digital signals of the digital image individually having a value between values of the first set of digital signals so as to correspond to a non-integer number of discrete photoelectron; and
   a quantization circuit configured to convert the second set of digital signals to a third set of digital signals of the digital image, wherein the third set of digital signals individually has a value corresponding to an integer number of discrete photoelectrons.

2. The image sensor of claim 1, wherein to convert the second set of digital signals to the third set of digital signals, the quantization circuit is configured to:
   for an individual one of the second set of digital signals, compare (a) the value of the digital signal and (b) a threshold;
      identify a third value based on comparison of (a) the value of the digital signal and (b) the threshold, wherein the third value corresponds to an integer number of discrete photoelectrons; and
      replace the value of the digital signal with the third value.

3. The image sensor of claim 2, wherein the threshold is between two values each corresponding to an integer number of discrete photoelectrons, and wherein the quantization circuit is configured to:
   determine whether the value of the digital signal is less than the threshold;
   in response to a determination that the value of the digital signal is larger than the threshold, identify one of the two values larger than the threshold as the third value; and
   in response to a determination that the value of the digital signal is not larger than the threshold, identify the other one of the two values less than the threshold as the third value.

4. The image sensor of claim 1, wherein the quantization circuit is configured to be deactivated such that the quantization circuit retains the values of the second set of digital signals without converting the second set of digital signals to the third set of digital signals.

5. The image sensor of claim 1, further comprising:
   an auto black level correction (ABLC) circuit operatively coupled between the one or more analog-to-digital conversion circuits and the quantization circuit, wherein the ABLC circuit is configured to correct darkness associated with the digital signals of the pixels.

6. The image sensor of claim 1, further comprising:
   an optical black (OB) pixel subtraction circuit operatively coupled between the one or more analog-to-digital conversion circuits and the quantization circuit, wherein the OB pixel subtraction circuit is configured to correct darkness associated with the digital signals of the pixels on one row.

7. The image sensor of claim 1, further comprising:
   a data interface circuit configured to transfer the first set of digital signals and the third set of digital signals to a device external to the image sensor.

8. The image sensor of claim 1, wherein the image sensor is implemented using one or more integrated circuits on a semiconductor die.

9. The image sensor of claim 1, wherein the image sensor is a CMOS (complementary metal-oxide semiconductor) image sensor or a CCD (charge-coupled device) image sensor.

10. A system, comprising:
    one or more lenses; and
    an image sensor configured to receive light that has passed through the lenses to reach the image sensor, comprising:
       a plurality of pixels configured to generate analog signals corresponding to a digital image based on photoelectrons accumulated by the pixels when exposed to the light;
       one or more analog-to-digital conversion circuits configured to convert the analog signals to digital signals of the digital image, wherein the digital signals include (a) a first set of digital signals of the digital image individually having a value corresponding to an integer number of discrete photoelectrons and (b) a second set of digital signals of the digital image individually having a value between values of the first set of digital signals so as to correspond to a non-integer number of discrete photoelectron; and
       a quantization circuit configured to convert the second set of digital signals to a third set of digital signals of the digital image, wherein the third set of digital signals individually has a value corresponding to an integer number of discrete photoelectrons.

11. The system of claim 10, wherein to convert the second set of digital signals to the third set of digital signals, the quantization circuit is configured to:
    for an individual one of the second set of digital signals, compare (a) the value of the digital signal and (b) a threshold;
       identify a third value based on comparison of (a) the value of the digital signal and (b) the threshold, wherein the third value corresponds to an integer number of discrete photoelectrons; and
       replace the value of the digital signal with the third value.

12. The system of claim 11, wherein the threshold is between two values each corresponding to an integer number of discrete photoelectrons, and wherein the quantization circuit is configured to:
    determine whether the value of the digital signal is less than the threshold;

in response to a determination that the value of the digital signal is larger than the threshold, identify one of the two values larger than the threshold as the third value; and in response to a determination that the value of the digital signal is not larger than the threshold, identify the other one of the two values less than the threshold as the third value.

13. The system of claim 10, wherein the quantization circuit is configured to be deactivated such that the quantization circuit retains the values of the second set of digital signals without converting the second set of digital signals to the third set of digital signals.

14. The system of claim 10, wherein the image sensor further comprises:

an auto black level correction (ABLC) circuit operatively coupled between the one or more analog-to-digital conversion circuits and the quantization circuit, wherein the ABLC circuit is configured to correct darkness associated with the digital signals of the pixels.

15. The system of claim 10, wherein the image sensor further comprises:

an optical black (OB) pixel subtraction circuit operatively coupled between the one or more analog-to-digital conversion circuits and the quantization circuit, wherein the OB pixel subtraction circuit is configured to correct darkness associated with the digital signals of the pixels on one row.

16. The system of claim 10, wherein the image sensor further comprises:

a data interface circuit configured to transfer the first set of digital signals and the third set of digital signals to a device external to the image sensor.

17. The system of claim 1, wherein the image sensor is implemented using one or more integrated circuits on a semiconductor die.

18. A device, comprising:

a camera, comprising:

one or more lenses; and an image sensor configured to receive light that has passed through the lenses to reach the image sensor, comprising:

a plurality of pixels configured to generate analog signals corresponding to a digital image based on photoelectrons accumulated by the pixels when exposed to the light;

one or more analog-to-digital conversion circuits configured to convert the analog signals to digital signals of the digital image, wherein the digital signals include (a) a first set of digital signals of the digital image individually having a value corresponding to an integer number of discrete photoelectrons and (b) a second set of digital signals of the digital image individually having a value between values of the first set of digital signals so as to correspond to a non-integer number of discrete photoelectron; and a quantization circuit configured to convert the second set of digital signals to a third set of digital signals of the digital image, wherein the third set of digital signals individually has a value corresponding to an integer number of discrete photoelectrons; and an image signal processor configured to process the first set of digital signals and the third set of digital signals to generate one or more images.

19. The device of claim 18, wherein to convert the second set of digital signals to the third set of digital signals, the quantization circuit is configured to:

for an individual one of the second set of digital signals, compare (a) the value of the digital signal and (b) a threshold;

identify a third value based on comparison of (a) the value of the digital signal and (b) the threshold, wherein the third value corresponds to an integer number of discrete photoelectrons; and replace the value of the digital signal with the third value.

20. The device of claim 19, wherein the threshold is between two values each corresponding to an integer number of discrete photoelectrons, and wherein the quantization circuit is configured to:

determine whether the value of the digital signal is less than the threshold;

in response to a determination that the value of the digital signal is larger than the threshold, identify one of the two values larger than the threshold as the third value; and in response to a determination that the value of the digital signal is not larger than the threshold, identify the other one of the two values less than the threshold as the third value.

* * * * *